(12) United States Patent
Bellur et al.

(10) Patent No.: US 8,090,949 B2
(45) Date of Patent: Jan. 3, 2012

(54) CERTIFICATE ASSIGNMENT STRATEGIES FOR EFFICIENT OPERATION OF THE PKI-BASED SECURITY ARCHITECTURE IN A VEHICULAR NETWORK

(75) Inventors: Bhargav Ramchandra Bellur, Karnataka (IN); Anitha Varghese, Kerala (IN); Rajeev Shorey, New Delhi (IN); Srinivasan Rajavelu, Tamilnadu (IN); Aditya R. Karnik, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 864 days.

(21) Appl. No.: 12/047,865

(22) Filed: Mar. 13, 2008

(65) Prior Publication Data

US 2009/0235071 A1    Sep. 17, 2009

(51) Int. Cl.
*H04L 9/32* (2006.01)
*H04L 29/06* (2006.01)
*G01C 21/00* (2006.01)

(52) U.S. Cl. ......... 713/175; 713/158; 700/200; 700/300
(58) Field of Classification Search ........................ None
See application file for complete search history.

(56) References Cited

U.S. PATENT DOCUMENTS

| | | | | |
|---|---|---|---|---|
| 7,233,942 B2* | 6/2007 | Nye | ...... | 1/1 |
| 7,296,736 B2* | 11/2007 | Yamagiwa | ...... | 235/382 |
| 7,447,685 B2* | 11/2008 | Nye | ...... | 1/1 |
| 2005/0143883 A1* | 6/2005 | Yamagiwa | ...... | 701/32 |
| 2006/0007003 A1* | 1/2006 | Yamagiwa | ...... | 340/572.1 |
| 2008/0232595 A1* | 9/2008 | Pietrowicz et al. | ...... | 380/277 |
| 2009/0070290 A1* | 3/2009 | Nye | ...... | 707/2 |
| 2009/0132813 A1* | 5/2009 | Schibuk | ...... | 713/158 |
| 2011/0083011 A1* | 4/2011 | Dicrescenzo | ...... | 713/158 |

FOREIGN PATENT DOCUMENTS

| KR | 10-2007-0007032 A | 1/2007 |
|---|---|---|
| KR | 10-2007-0106055 A | 11/2007 |

OTHER PUBLICATIONS

Raya et al, "Certificate Revocation in Vehicular Networks", 2006, Laboratory for Computer Communications and Applications (LCA), p. 1-10.*

Wu et al, "An Architecture Study of Infrastructure-Based Vehicular Networks", Oct. 2005, MSWiM '05, ACM, p. 36-39.*

(Continued)

*Primary Examiner* — Christopher Revak
(74) *Attorney, Agent, or Firm* — John A. Miller; Miller IP Group, PLC

(57) ABSTRACT

A system and method for assigning certificates and reducing the size of the certificate revocation lists in a PKI based architecture for a vehicle wireless communications system that includes separating a country, or other area, into geographic regions and assigning region-specific certificates to the vehicles. Therefore, a vehicle need only process certificates and certificate revocation lists for the particular region that it is traveling in. Vehicles can be assigned multiple certificates corresponding to more than one region in the vehicles vicinity as advance preparation for possible travel or transmission into nearby regions. Further, the expiration time of certificates assigned to vehicles corresponding to a given geographic region can be tailored to be inversely proportional to the distance from a registered home region of the vehicle. A scalable design for a back-end certifying authority with region-based certificates can also be provided.

20 Claims, 3 Drawing Sheets

OTHER PUBLICATIONS

Xiaoting Sun, "Anonymous, Secure and Efficient Vehicular Communications." A thesis for the degree of Master of Mathematics in Computer Science, the University of Waterloo, Sep. 20, 2007.

Ghita Mezzour, "Credentials Revocation in Vehicular Networks: Design and Evaluation." Report, Semester project and Miniproject IC-71 Security and Cooperation in Wireless Networks, Doctoral Program in Computer, Communication and Information Sciences, Ecole Polytchnique Federale de Lausanne, Fall 2007.

Maxim Raya and Jean-Pierre Hubaus, "The Security of Vehicular Ad Hoc Networks." In: Proceedings of the 3rd ACM workshop on Security of ad hoc and sensor networks, Nov. 7, 2005.

* cited by examiner

CERTIFICATE ASSIGNMENT STRATEGIES FOR EFFICIENT OPERATION OF THE PKI-BASED SECURITY ARCHITECTURE IN A VEHICULAR NETWORK

BACKGROUND OF THE INVENTION

1. Field of the Invention

This invention relates generally to a public key infrastructure (PKI) based security architecture for a wireless vehicle communications network and, more particularly, to a system and method for maintaining certificates and certificate revocation lists in a PKI based security architecture for a vehicle wireless communications network that includes separating a country, or other area, into geographic regions and assigning region specific certificates to the vehicles.

2. Discussion of the Related Art

Traffic accidents and roadway congestion are significant problems for vehicle travel. Vehicular ad-hoc network based active safety and driver assistance systems are known that allow a vehicle communications system to transmit messages to other vehicles in a particular area with warning messages about dangerous road conditions, driving events, accidents, etc. In these systems, multi-hop geocast routing protocols, known to those skilled in the art, are commonly used to extend the reachability of the warning messages, i.e., to deliver active messages to vehicles that may be a few kilometers away from the road condition, as a one-time multi-hop transmission process. In other words, an initial message advising drivers of a potential hazardous road condition is transferred from vehicle to vehicle using the geocast routing protocol so that vehicles a significant distance away will receive the messages because one vehicle's transmission distance is typically relatively short.

The safety critical nature of vehicle-to-vehicle (V2V) and vehicle-to-infrastructure (V2I) applications makes it necessary that V2X messages be protected from spoofing, alteration and replay. To ensure the integrity of V2X messages, PKI based security architectures are being actively investigated.

Each principal in a PKI system has a pair of keys, namely a private key and a public key. The private key is known only to the principal and the public key can be shared with other entities in the system. The keys can be visualized as a pair of functions $P_r$ and $P_u$ representing the private and public keys, respectively, and having the property $M=P_r(P_u(M))$ and $M=P_u(P_r(M))$, where M is the message that is to be secured using the keys. To ensure message integrity, the sender of the message signs the message with its private key, and adds this signature to the message. Upon receiving the message, the recipient can verify the signature of the message using the sender's public key.

A fundamental problem in the PKI architecture is the exchange of the public keys without compromising them. One widely accepted solution is for a trusted entity, known as a certifying authority (CA), to digitally sign data structures, known as certificates, that state the binding nature between names and public keys. In the case of the IEEE 1609.2 standard, a certificate includes several fields, namely the public key, geographic scope or region of the certificate, a certified revocation list series number associated with the certificate, the expiration time of the certificate and the signature of the CA. In order to verify the certificates signed by the CA, the public key of the CA must be available at each entity of the PKI system. Because the distribution of all of the certificates issued by the CA is impractical, the IEEE 1609.2 standard specifies that a sender should add its certificate to a signed message.

The efficient operation of PKI based security architectures in a vehicular network requires that vehicles have access to revocation information in a timely manner. Certified revocation lists (CRLs) are the primary mechanism through which revocation information is disseminated in a PKI based framework. A CRL is a message signed by a certifying authority (CA) listing all certificates in a network that are revoked. Therefore, if an entity sends spurious or other unwanted messages, it can be put on the CRL so that messages sent by that entity can be discarded by other users.

Only CAs can generate CRLs, and thus are messages signed by the CA using the private key of the CA. Each vehicle verifies the CRL message by using the public key of the CA. The entries in a CRL include a list of all revoked certificates, the CRL series number that the CRL is associated with, the time period that the CRL covers, the time at which a CRL for the CRL series will be next issued and the signature of the CA. Updating the CRLs is more difficult in the vehicular network because the vehicle is only intermittently connected to the back-end certifying authority.

In the vehicular context with long product lifetimes, if the certificates assigned to an on board unit (OBU) for the communications network on a vehicle are not renewed during a lifetime of the vehicle, they have an expiration time on the order of years. Moreover, a number of OBUs in a nationwide vehicular network could be as large as 500 million. Hence, the size of the CRLs in a vehicular network is likely to be extremely large.

The vehicular environment imposes constraints on the manner in which revocation information can be acquired by an OBU, and the amount of revocation information that can be stored at each OBU. The former is due to the lossy nature of broadcast transmissions over the wireless medium, and the fact that an OBU has intermittent connectivity to the wired infrastructure network deployed along the roadside. Moreover, the amount of revocation information that can be stored at each OBU is limited by the memory available at the OBU.

Existing methods to reduce the size of CRLs include delta CRLs and segmentation of CRLs. In the delta CRL case, the CA issues CRLs containing all the certificates revoked within a given time window. The CA can also segment CRLs into different CRL series numbers. For segmentation of CRLs, the CA maps each certificate to a specific CRL series number, which is a given field in the certificate. Later on, when distributing CRLs, the CA bundles all of the revoked certificates corresponding to a given CRL series number into a single CRL. Consider an OBU that wants to ascertain the possible revoke status of the senders certificate. The OBU needs to only obtain the most recent CRL with the CRL series number associated with the sender's certificate.

SUMMARY OF THE INVENTION

In accordance with the teachings of the present invention, a system and method are disclosed for assigning certificates and reducing the size of the certificate revocation lists in a PKI based architecture for a vehicle wireless communications system that includes separating a country, or other area, into geographic regions and assigning region-specific certificates to the vehicles. Therefore, a vehicle need only process certificates and certificate revocation lists for the particular region that it is traveling in. Vehicles can be assigned multiple certificates corresponding to more than one region in the vehicles vicinity as advance preparation for possible travel or transmission into nearby regions. Further, the expiration time of certificates assigned to vehicles corresponding to a given geographic region can be tailored to be inversely proportional to the distance from a registered home region of the vehicle. A scalable design for a back-end certifying authority with region-based certificates can also be provided.

The present invention reduces the complexity of managing a public key infrastructure based security framework in a vehicular network by reducing the size of the certification revocation lists required for message verification at an OBU, simplifies the design of a back-end certifying authority, and permits different administrative policies for different regions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for issuing certificates and reducing the size of a certificate revocation list in a PKI based vehicle communications system is merely exemplary in nature, and is in no way intended to limit the invention or its applications or uses. For example, the present invention can be extended to a mobile wireless network where each node/device has a GPS interface as well as a wireless interface for short range communications.

Figure 1:
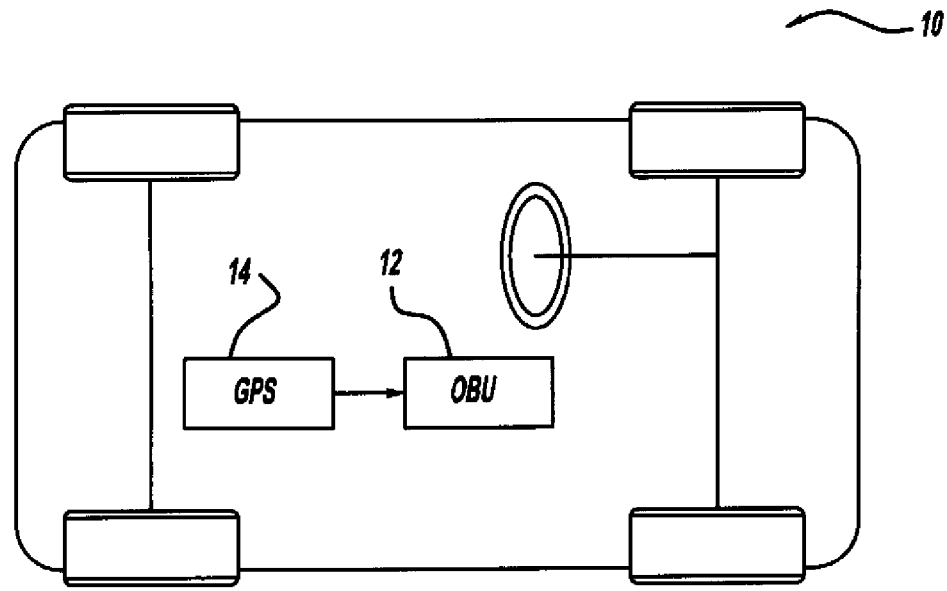
FIG. 1 is a plan view of a vehicle including an on board unit associated with a vehicle wireless communications system.

FIG. 1 a plan view of a vehicle 10 including an on-board unit (OBU) 12 for a V2X wireless communication system. The OBU 12 receives location information from a GPS receiver 14, and is able to communicate with other OBUs on other vehicles within a limited range. In order to reduce the number of CRLs that the OBU 12 needs to process, the present invention proposes certificate assignment strategies that include segmenting a country, or other area, into geographic regions, and assigning region specific certificates to an OBU.

Figure 2:
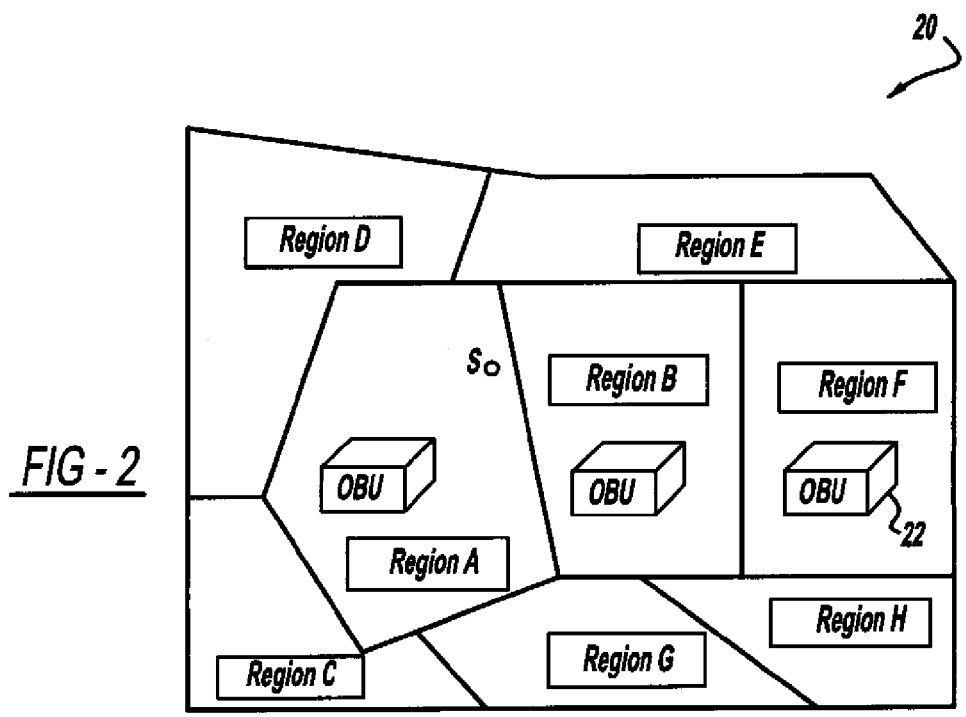
FIG. 2 is an illustration of an area separated into several regions that define what certificate revocation lists will be issued to vehicles in those regions, according to an embodiment of the present invention.

FIG. 2 is a plan view of an area 20, such as the United States, that has been segmented into predefined regions A-H. In one non-limiting embodiment, each of the regions A-H is about 100 square miles. OBUs 22 are shown in regions A, B and F.

Figure 3:
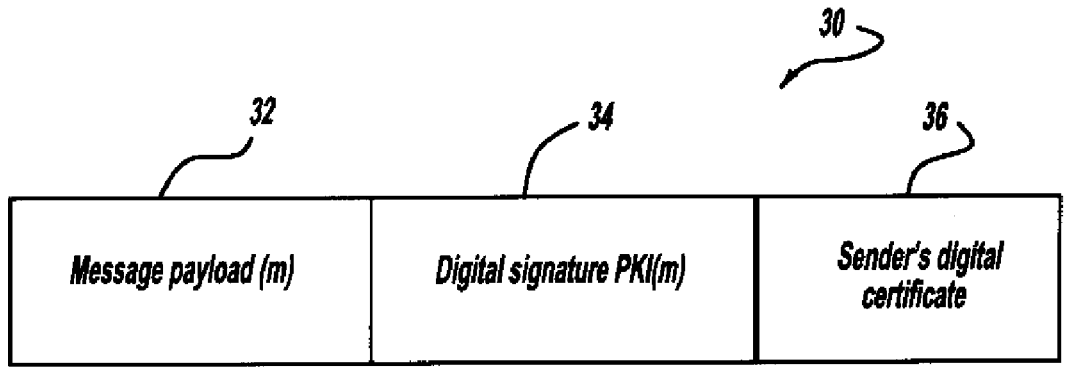
FIG. 3 is a high-level message structure for messages sent by a protocol used in the wireless vehicle communications system.

FIG. 3 is a representation of a message 30 that is separated into a message payload 32, a digital signature 34 based on the sender's private key, and the senders digital certificate 36. A certificate is said to be valid if it has not expired and it has not been revoked by the CA. Checking the revoked status of any certificate involves acquiring the CRL corresponding to that certificate, i.e., the CRL with the CRL series number specified in the certificate. When transmitting a message, the sender adds the sender's certificate and the signature of the message using the sender's private key to the message. When receiving a message, the receiver verifies the validity of the senders certificate and verifies the signature on the message 30 using the sender's public key that is part of the sender's certificate before accepting the message. Thus, depending on which of the regions A-H the vehicle 10 is currently in will depend on what region specific certificate would be in part 36 of the message 30. Thus, a user within a specific region A-H that receives a message that does not have a digital certificate for that region will discard the message as invalid.

Vehicles are also assigned multiple certificates corresponding to regions in a particular vehicle's vicinity as advance preparation for possible migration and transmission into adjoining regions. For example, an OBU can be assigned one certificate corresponding to its current geographic region, and one for each of the neighboring regions to that region. As the vehicle moves between regions it receives signed certificates corresponding to the region it traverses. However, multiple certificates corresponding to the different geographic regions may in fact derive from the same public and private key pair. Particularly, the digital signature 34 part of the message 30 may be the same for each region that the vehicle is in, but the digital certificate 36 will be different for the different regions.

If the multiple certificates derive from the same public key/private key pair, even though the certificate of the OBU depends on the geographic region, the digital signature of the message will be the same for different geographic regions. On the other hand, if the multiple certificates assigned to an OBU derive from different public key/private key pairs, then both the certificate of the OBU and the digital signature of the message 30 will depend on the geographic region. In the first approach, because the signature of the message is invariant to the geographic region, the operation of a vehicle as it moves across geographic regions is simplified. However, the lack of privacy associated with the vehicle is a concern with this approach because the multiple certificates are all derived from the same public key/private key pair.

The CA segments the CRLs in the manner described below. The CA maps all of the certificates assigned to vehicles corresponding to geographic region X to a specific CRL series number. In other words, corresponding to geographic region X an OBU has a signed certificate with the CRL series number given by the CA. Recall that OBUs on vehicles are constrained to append signed messages using the certificate corresponding to their current geographic region. Hence, all OBUs operating in a given geographic region X append signed messages with certificates that had the same CRL series number.

The proposed strategy of the invention also requires OBUs to discard, i.e., make no attempt to verify the senders certificate, signed messages that are not appended with a certificate corresponding to the current geographic region of the vehicle. Hence, in order to verify a received message, a vehicle operating in region X needs to acquire only the CRL corresponding to its current geographic region. However, for vehicles operating near the border with adjacent regions, there is also a need for the vehicle to receive CRLs corresponding to those adjacent regions.

To further reduce the size of the CRLs, the certifying authority can tailor the expiration time of certificates assigned to an OBU corresponding to a given geographic region X to be inversely proportional to the distance between region X and the registered home region of the vehicle. This helps to reduce the size of the CRLs because certificates that have expired do not have to be explicitly revoked.

The following notation will be used below to describe the operation of vehicles with region-based certificates. For an OBU, its current GPS position is designated at GPS(obu). The certificate assigned to an OBU corresponding to the geographic region X is designated by Cert(obu X). In accordance with the above described CRL segmentation mechanism employed by the CA, the certificate Cert(obu, X) has the CRL series number CRLSeriesNo(X). Hence, a certificate Cert (obu, X) has the fields the public key of the OBU designated publicKey(obu, X), geographic region X, CRL series number CRLSeries No(X), time of expiration of the certificate designated by expirytime(obu, X) and the signature of the CA over the several fields. Note that the first field publicKey(obu, X) can simply be denoted publicKey(obu) if the multiple certificates assigned to an OBU for the different geographic regions all derive from the same public key/private key pair.

Distance (x,y) denotes the distance between regions X and Y. The distance between the OBU and the geographic region X is designated Dist(obu, X). If the boundary of the geographic region X is designated by Boundary (X), then Dist (obu, x)=min Distance(GPS(obu), x) for all x in Boundry (X).

For the different geographic regions described in the IEE 1609.2 standard, it is straight forward to compute Dist(obu, x) in an efficient manner. The maximum transmission range of an OBU is designated by MaxTransRange, and can be 500-1000 meters in a non-limiting example. An OBU is close the boundary of a geographic region X if Dist(obu, X)<MaxTransRange. This implies that a packet transmission initiated by the OBU can be received by a node located in a neighboring geographic region. Likewise, an OBU is said to be centrally located within a geographic region X if it is present within the region X and Dist(obu, X)>MaxTransRange. This implies that a packet transmission initiated by the OBU can be received only by nodes in region X. Finally, the geographic region Y is said to be a neighbor of geographic region X if there exists positions x and y belonging to X and Y, respectively, such that Distance(x, y)<MaxTransRange. Obviously, if the regions X and Y share a boundary or a common area, then they are neighbors of each other.

Assume that each OBU contains a map of the segmentation of the entire country into geographic regions. Using GPS information, an OBU resident in a vehicle can keep track of the geographic region it is currently in, and its neighboring regions. In particular, an OBU operating in geographic region X can determine Dist(obu, X) and Dist(obu, Y) for each region Y that is a neighbor of region X. Also, vehicles can determine in advance when they are about to migrate from their current geographic region into a neighboring region. For example, OBUs can use the current velocity of the vehicle, and its current position to predict the future position of the vehicle.

Each OBU contains a map of the segmentation of the entire county into geographic regions in its memory. However, an OBU present in region X needs to access the map pertaining to regions in the vicinity of region X. Hence, there exist efficient mechanisms to store the map in memory based on certain caching policies that depend on the current position of the vehicle. Moreover, the segmentation of the country into geographic regions can be done in a manner to simplify the computations described in this invention. For example, the geographic regions could be a square grid of 100 miles, or could be a grid based on latitude and longitude.

At the end of the manufacturing process, each OBU is imprinted with the CA's certificate. After a customer purchases a vehicle, the OBU places a request for assignment of certificates to the certifying authority, perhaps indicating a position of the vehicle based on the home address of the customer. The CA responds with a set of certificates depending on the position of the OBU, and registers the OBU with its home region.

Figure 4:
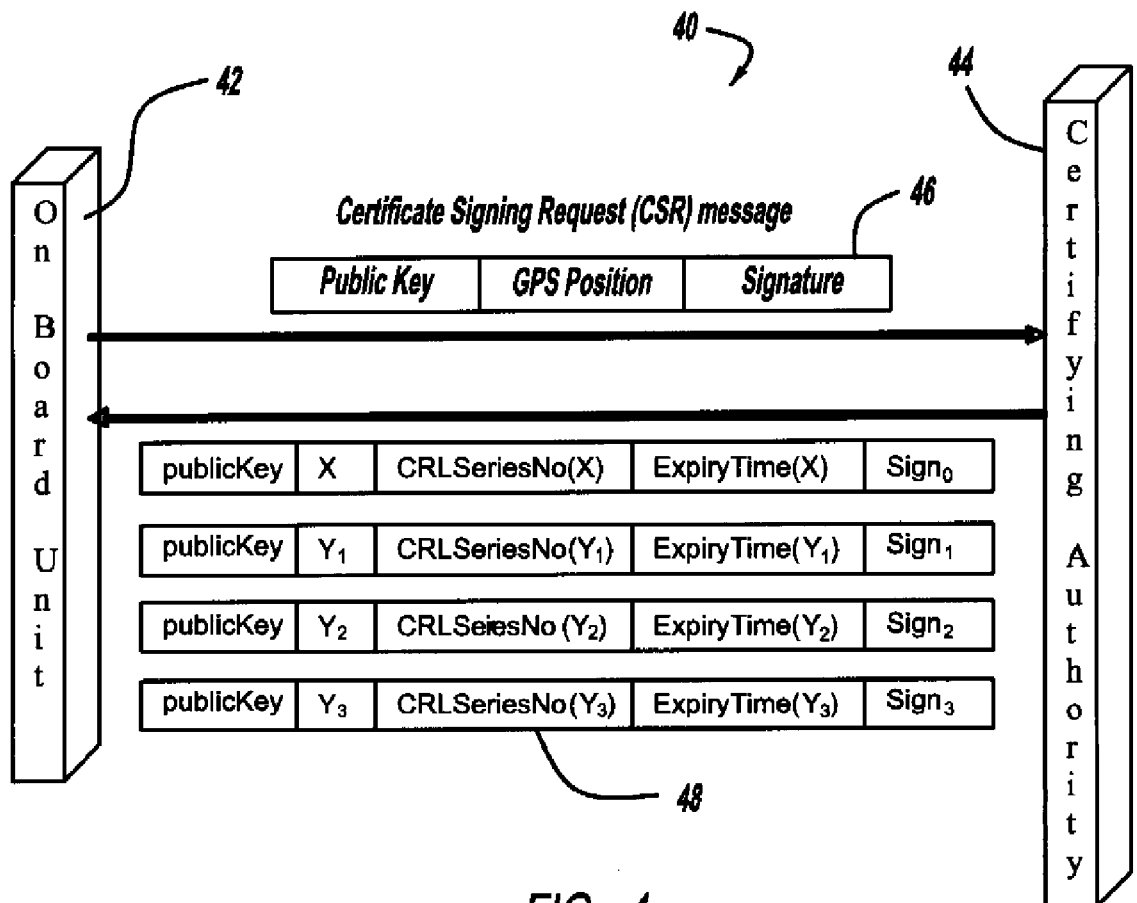
FIG. 4 is an illustration of a process for assigning multiple certificates to a vehicle that includes a certificate revocation list for multiple regions, according to an embodiment of the present invention.

FIG. 4 shows a system 40 for the assignment of multiple certificates to an OBU 42 by a CA 44. The OBU 42 sends a certificate signing request (CSR) message 46 to the CA 44 by indicating its current position, and the public key for which the certificate is being requested. The CSR message 46 is signed using the private key of the OSU 42. Upon receiving the message 46, the CA 44 first verifies the message 46 using the public key that is part of the message 46. The CA 44 then determines the region X in which the OBU 42 is currently located, and the neighboring regions Y of region X. The CA 44 then responds with multiple certificates 48, one for the current geographic region, and one for each of the neighboring regions Y.

As mentioned above, the multiple certificates assigned to a vehicle are derived from the same public key/private key pair. The certificates differ in the value pertaining to the CRL series number and the geographic scope of the certificate. The CA 44 also responds with the certificate revocation lists corresponding to the different geographic regions. Finally, the CA 44 registers the OBU 42 with its home region depending on the position specified by the OBU 42 in the CSR message 46. Note that it is straight forward to generalize this certificate assignment mechanism. In the general case, the CA 44 may assign a total of L certificates to the OBU 42. For example, one certificate could be assigned to each of the geographic regions that are within 100 miles of the position specified by the OBU 42 and the CSR message 46.

There will be a situation where an OBU transmitting a message is close to the boundary of its current geographic region. In this case, the message transmitted by the OBU may also be received in the neighboring region. With completely disjoint geographic regions, security framework with region-based certificates has the following two distinct versions, described in detail below. FIG. 2 depicts an example to distinguish between the two versions. An OBU is located at position S within geographic region A such that it is close to the boundary of geographic regions A and B. In a first framework A, the OBU would append its signed messages with a certificate corresponding to geographic region A. In a second framework B, the OBU would append signed messages with the certificate corresponding to both regions A and B because the OBU is close to the boundary of region B. It will become apparent that the first version requires that CRLs corresponding to neighboring regions be disseminated within a given geographic region because a received message can be accepted for verification at a node if it is appended with a certificate corresponding to a neighboring geographic region. However, the second version requires only CRLs corresponding to a given geographic region to be distributed within that region.

For the framework A, an OBU signs the message with its private key. It then appends the signed message with a certificate corresponding to only its current geographic region.

To verify a signed message, an OBU currently present in geographic region X performs the following steps. It discards the message if the senders certificate does not correspond to either the current geographic region X or a neighboring geographic region Y such that the OBU is close to the boundary of region Y. The receiving OBU also verifies that the senders certificate is valid, i.e., has not expired, and has not been revoked. The revoked status of the sender's certificate can be determined by looking at the appropriate CRL. The CRL specified by the CRL series number CRLSeriesNo(X) if the senders certificate corresponds to geographic region X or the CRL is specified by the CRL series number CRLSeriesNo(Y) if the sender's certificate corresponds to a neighboring geographic region Y. The receiving OBU will then verify the signature of the message and accept the message if all of the verifications pass.

When an OBU in the geographic region X determines that it has moved close to the boundary of a neighboring geographic region Y, it starts to accept signed messages that are appended with a certificate corresponding to geographic region Y in addition to accepting signed messages that are pended with a certificate corresponding to its current geographic region X. The sending OBU also acquires the CRL with the CRLSeriesNo(Y) that has been issued by the certifying authority for a region Y.

The OBU also places a request to the CA for a fresh set of certificates when the certificate corresponding to a geographic region that the vehicle is likely to visit in the near future is about to expire. Like the initial certificate assignment procedure, the CA responds with a set of certificates.

For the framework B, to sign a message, an OBU signs the message with its private key and then appends the signed message with a certificate corresponding to its current geographic region and the certificate corresponding to each neighboring region Y when the vehicle is close to the boundary of region Y.

To verify a signed message, a receiving OBU currently present in geographic region X discards the message if none of the senders certificates correspond to the current geographic region X, and verifies that the sender's certificate corresponding to geographic region X is valid, i.e., has not expired, and has not been revoked. The revoked status of the sender's certificate can be determined by looking at the CRL specified by the CRL series number CRLSeriesNo(X). The receiving OBU will also verify the signature of the message and accept the message if all of the verifications pass.

When an OBU in a geographic region X determines that it has moved close to a boundary of a neighboring region Y, it starts to append signed messages with a certificate corresponding to region Y in addition to appending signed messages with a certificate responding to its current geographic region X. An OBU places a request for the CA for a fresh set of certificates when the certificate corresponding to a geographic region the vehicle is likely to visit in the near future is about to expire. As with the initial certification assignment, the CA responds with a set of certificates.

With overlapping geographic regions, the security framework with region-based certificates is described below. Because an OBU can be present in multiple regions at the same time, the question arises as to which certificate the OBU appends to its signed messages. To keep things simple, assume that the degree of overlap between geographic regions is significant. In particular, for any point x, there exists a geographic region R such that point x is centrally located within the region R.

To sign a message, an OBU signs the message with its private key. It then appends the signed message with the certificate corresponding to one of the geographic regions it is presently located. In particular, the OBU selects the certificate corresponding to the geographic region W, such that Dist(obu, W) is the maximum among Dist(obu, W*) for all geographic regions W in which the OBU is presently located. As a result of this assumption, the OBU selects the certificate corresponding to a geographic region W within which the OBU is centrally located. This implies that all of the OBUs that receive this message are also located within the geographic region W.

To verify a signed message, an OBU discards a message without attempting to verify the message if the sender's certificate does not correspond to any of the geographic regions W in which the OBU is currently present in. The OBU also verifies that the sender certificate is valid, i.e., has not expired, and has not been revoked. The revoked status of the senders certificate can be determined by looking into the CRL specified by the CRL series number CRLSeriesNo(W). The OBU will also verify the signature of the message and accept the message if all of the verifications pass.

According to another embodiment of the present invention, a scalable design of a back-end certifying authority can be provided when OBUs resident on vehicles use region-based certificates. The primary functions of the CA include responding to certificate requests from the OBUs and generating CRLs. While region-based certificate assignments will work with a hierarchy of CAs, the objective herein is to consider the case of a solitary CA. In particular, with region-based certificates, it can be shown that the design of the back-end CA can be scalable even when there is a solitary CA.

In the absence of a hierarchy of CAs, it is assumed that there exists a solitary CA with its asymmetric key pair. The main drawback of this approach is that the solitary CA needs to respond to all of the certificate requests, and is responsible for the generation of CRLs. Because the solitary CA can be a potential bottleneck, it is observed that the scalability of a region-based certificate assignment depends on whether the certificate request and response procedures in the different geographic regions are independent of each other. In addition, scalability depends on whether the generation of CRLs in the different geographic regions is independent of each other.

Figure 5:
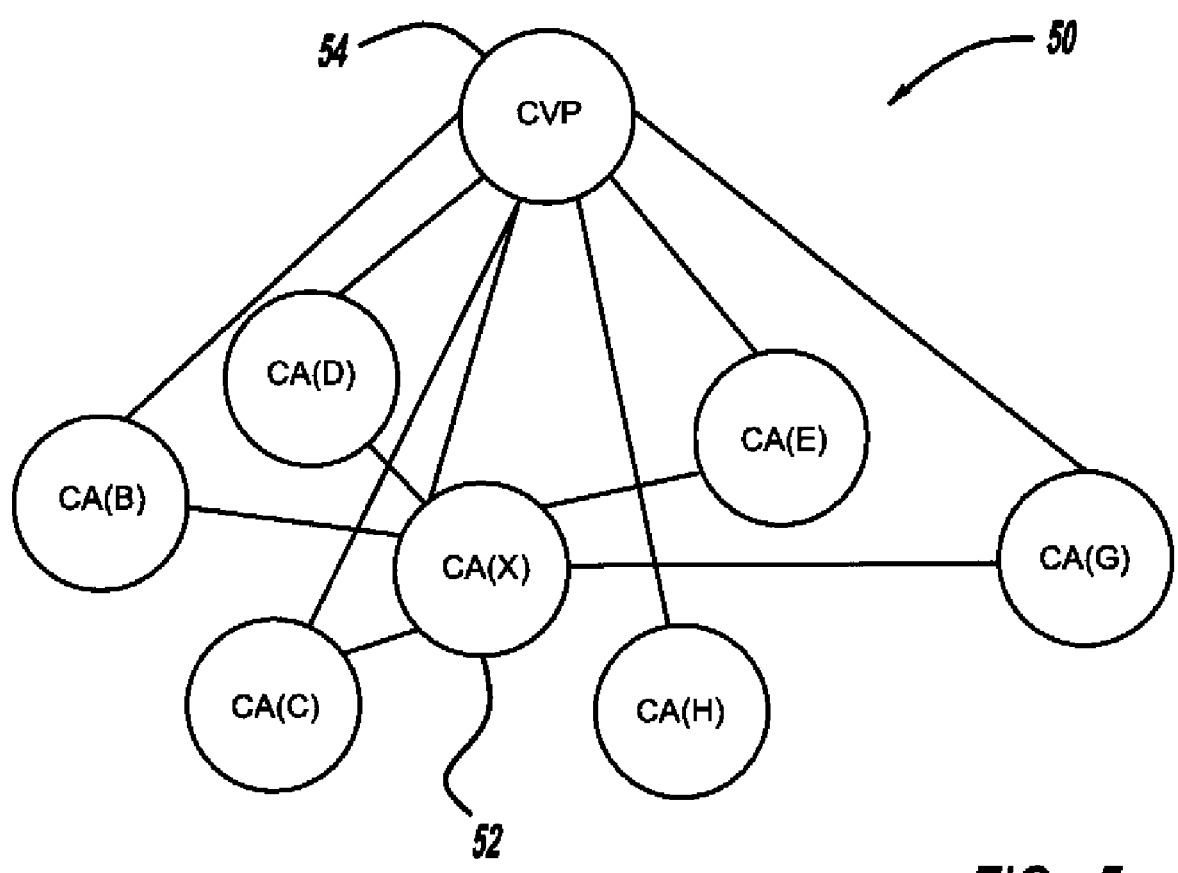
FIG. 5 is an illustration of a scalable design for a back-end certifying authority, according to an embodiment of the present invention.

FIG. 5 depicts a high-level scalable design of a solitary back-end CA 50 and uses the following notation. Node CA(X) 52 is a process that is responsible for issuing certificates and CRLs corresponding to geographic region X. If regions X and Y are neighboring regions, the process CA(X) 52 is directly connected to the process CA(Y). The connectivity between two processes within the back-end CA could be a TCP connection between the respective endpoints. In addition, the design of the solitary CA includes a central entity referred to as the central verifying process (CVP). A central verifying process (CVP) 54 primarily performs bookkeeping operations, and every process CA(X) 52 is directly connected to the central verifying process. Note that the CVP 54 does not perform computationally intensive operations, such as issuing certificates to OBUs or generating CRLs corresponding to a geographic region.

As discussed above, the multiple certificates assigned to a vehicle in the proposed region-base certificate method is derived from the same asymmetric key pair. An OBU associated with the asymmetric key pair is valid if no malicious messages signed with the private key have been detected, and the private key has not been compromised. The CVP 54 maintains the value of the public key associated with the OBU, the registered home region of the OBU and the status of the public key for every OBU. If the public key is valid, then the CVP maintains a list of geographic regions W such that an unexpired certificate has been assigned to the OBU corresponding to geographic region W.

With the above design of the back-end CA, it can be shown that the certificate request and response procedures in the different geographic regions are independent of each other. To this end, consider a certificate signing request (CSR) message from an OBU with an asymmetric key pair located in geographic region X. With the back-end solitary CA, the sequence of steps taken to process this CSR message is described as follows.

First it is assumed that spatial proximity ensures that the CSR message is received by the process CA(X) 52. The process CA(X) sends a query to the CVP 54 to check the feasibility of an OBU corresponding to the public key being present in the geographic region X. Next, the CVP 54 responds to the process CA(X) 52 after verifying whether the entry for the public key maintained in its database is valid, and the CVP 54 checks the existence of a continuous sequence of geographic regions $Y_1, Y_2, \ldots, Y_k$, from the OBUs registered home region to the geographic region X such that the OBU has been assigned a certificate corresponding to each of the intermediate regions $Y_i$. Next, if the response from the CVP 54 is affirmative, the process CA(X) 52 generates a certificate for the OBU corresponding to the geographic region X and denoted by Cert(Public Key, X). The process CA(X) also sends a message to each of the processes CA(Y) to which it is directly connected. Each process CA(Y) responds with a certificate denoted by Cert(Public Key, X). Otherwise, no certificates are granted to the OBU.

In the above disclosed procedure to generate certificates for multiple regions, note that the certificate generation mechanisms for the different geographic regions are independent of each other. Hence, this provides for a scalable design for the back-end CA. To complete the scalability argument, it can be shown that the generation of CRLs in the different geographic regions can be performed independently of each other. Recall that certificates assigned to an OBU associated with the asymmetric key pair are revoked when either malicious messages signed with a private key have been detected or the private key has been compromised. When this happens, the CVP 54 marks the entry corresponding to the public key invalid, and for each geographic region W for which an unexpired certificate exists for the OBU, the CVP 54 sends a message to the process CA(W) to revoke the certificate Cert(public key, W). Upon receiving this message, the process CA(W) revokes the certificate and adds it to the CRL corresponding to a region W.

The following discussion provides an example of how the region-based certificate assignment technique reduces the size of the CRLs over the prior techniques. As for the IEEE 1609.2 standard, each CRL entry is represented by the higher order q=10 bytes of the SHA-1 hash of the revoked certificate. Consider a nationwide VANET with N vehicles, where N equals 250 million. Let p denote the revocation rate, i.e., the fraction of revoked vehicles per year. Assuming that the fraction of revoked vehicles per year is 5%, and that the lifetime of OBU certificates is T years, where T=5 years, the steady-state size of CRLs without region-based certificates is given by:

$$NpTq = 250*10^6*(0.05)(5)(10) = 625 \text{ Megabytes}$$

The steady state size of the CRL computed above is the result of two opposing factors. In particular, a node includes new CRL entries corresponding to newly revoked certificates, and deletes CRL entries corresponding to expired certificates. In the absence of region-based certificates, the monthly rate of which new entries are added to the CRL is given by Npq/12=10 mega bytes per month.

By computing the size of the CRLs under the proposed region-based certificate assignment mechanism, considering nationwide VANET with N vehicles, N=250 million. Assume that the country is divided into 50 states, and each state is further segmented into 50 geographic regions for a total of R=2500 geographic regions. Note that the average number of vehicles in a geographic regions is $N/R = 250*10^6/2500 = 100,000$. As before, assume that the revocation rate, i.e., the fraction of revoked vehicles per year, is 5%, i.e., p=0.05.

Assume that the vehicles have limited mobility across geographic regions. In particular, assume that the average number of non-expired region-specific certificates assigned to a vehicle is denoted by M, such as M=20. Assume that the lifetime of an OBU certificate is T=5 years, the steady-state size of region-specific CRLs under the region-based certificate assignment mechanism is given by $(N/R)pTq = 20(250*10^{6/2500})(0.05)(5)(10) = 5$ Mega Bytes. In addition, the monthly rate at which new entries are added to a region-specific CRLs is M(N/R)p/12=82 kbytes per month. Hence, the reduction in CRL size achieved by using the region-based certificate assignment mechanism is of the order of R/M.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for assigning certificates in a public key based security architecture for a vehicle wireless communications network, said method comprising:
    separating an area into a plurality of geographic regions;
    assigning certificates to vehicles that are selected based on what region the vehicle is in, said certificates identifying a binding relationship between a vehicle and a public key;
    providing a certified revocation list to the vehicles in each region where the vehicles in a particular region receive information pertaining to revoked certificates for the region that they are in; and
    disregarding messages received by a vehicle in a specific region that include a certificate for another region.

2. The method according to claim 1 wherein messages transmitted by a vehicle include signature based on a private key and the vehicle's certificate based on its public key.

3. The method according to claim 1 wherein assigning certificates and providing a certified revocation list are performed by a certifying authority.

4. The method according to claim 1 further comprising assigning multiple certificates to a vehicle for different regions if the vehicle is in one region and is in the vicinity of one or more other regions.

5. The method according to claim 4 wherein messages sent by a vehicle using multiple certificates include the same public key and private key identifying the vehicle for all of the certificates.

6. The method according to claim 4 wherein messages sent by a vehicle using multiple certificates include a different public key and private key for each certificate identifying a particular region.

7. The method according to claim 1 further comprising assigning multiple certificates to a vehicle for different regions if the vehicle is transmitting messages into more than one region.

8. The method according to claim 1 further comprising setting the expiration time of a certificate corresponding to a particular geographic region to be inversely proportional to the distance a vehicle to which the certificate is assigned is from its registered home geographic region.

9. The method according to claim 1 further comprising providing a scalable design for a back-end certifying authority with region-based certificates.

10. The method according to claim 9 wherein the back-end certifying authority employs a central verifying process.

11. The method according to claim 1 wherein the area is a country.

12. The method according to claim 1 wherein the plurality of geographic regions are about 100 square miles.

13. A method for controlling messages sent within a vehicle wireless communications system, said method comprising:
identifying a certifying authority that assigns certificates to vehicles and generates certified revocation lists that identify certificates of users who have been revoked;
separating an area into a plurality of geographic regions;
assigning certificates to vehicles that are selected based on what region the vehicle is in, said certificates identifying a binding relationship between a vehicle and a public key, wherein assigning certificates includes assigning multiple certificates to a vehicle for different regions if the vehicle is in one region and is in the vicinity of one or more other regions;
providing a certified revocation list to the vehicles in each region where the vehicles in a particular region receive information pertaining to revoked certificates for the region that they are in; and
disregarding messages received by a vehicle in a specific region that include a certificate for another region, wherein messages transmitted by a vehicle include a signature based on a private key and the vehicle's certificate.

14. The method according to claim 13 wherein messages sent by a vehicle using multiple certificates include the same public key and private key identifying the vehicle for all of the certificates.

15. The method according to claim 13 wherein messages sent by a vehicle using multiple certificates include a different public key and private key for each certificate identifying a particular region.

16. The method according to claim 13 further comprising setting the expiration time of a certificate corresponding to a particular geographic region to be inversely proportional to the distance a vehicle to which the certificate is assigned is from its registered home geographic region.

17. The method according to claim 13 further comprising providing a scalable design for a back-end certifying authority with region-based certificates.

18. The method according to claim 13 further comprising assigning multiple certificates to a vehicle for different regions if the vehicle is transmitting messages into more than one region.

19. The method according to claim 13 wherein the area is a country.

20. A method for controlling messages sent within a vehicle wireless communications network, said method comprising:
separating an area into a plurality of geographic regions;
assigning certificates to vehicles that are selected based on what region the vehicle is in, said certificates identifying a binding relationship between a vehicle and a public key; and
assigning multiple certificates to a vehicle for different regions if the vehicle is in one region and is in the vicinity of one or more other regions.

* * * * *